United States Patent
Fleming

[11] Patent Number: 5,435,627
[45] Date of Patent: Jul. 25, 1995

[54] MULITPURPOSE DUMP TRUCK ADAPTOR

[76] Inventor: Patrick M. Fleming, 214 S. Newcomb St., Whitewater, Wis. 53190

[21] Appl. No.: 45,752

[22] Filed: Apr. 14, 1993

[51] Int. Cl.$^6$ .............................................. B60P 1/28
[52] U.S. Cl. ................... 298/17 R; 296/24.1; 296/184; 296/101; 298/1 R
[58] Field of Search ............... 298/1 R, 1 A; 296/5, 296/24.1, 184, 50, 51, 52, 61, 56, 100, 101; 414/498, 367, 373, 539, 572; 406/39, 40, 41; 220/1.5

[56] References Cited

U.S. PATENT DOCUMENTS

| | | | |
|---|---|---|---|
| 991,792 | 5/1911 | Lawler et al. | 296/33 |
| 2,803,847 | 8/1957 | Hobbs | 406/39 |
| 2,881,024 | 4/1959 | Saiberlich . | |
| 2,909,387 | 10/1959 | Burtzloff | 296/32 |
| 2,955,403 | 10/1960 | McKee | 406/41 |
| 3,026,139 | 3/1962 | Ackermann | 296/56 |
| 3,419,168 | 12/1968 | Isbell et al. | 406/39 |
| 3,588,179 | 6/1971 | Gifford | 406/40 |
| 3,895,842 | 7/1975 | Fair . | |
| 4,068,769 | 1/1978 | Sweet et al. | 296/56 |
| 4,084,851 | 4/1978 | Duncan, Sr. . | |
| 4,122,761 | 10/1978 | Westin et al. | 220/1.5 |
| 4,126,357 | 11/1978 | Day . | |
| 4,826,237 | 5/1979 | Socha . | |
| 4,830,436 | 5/1989 | Sockwell et al. | 296/13 |
| 5,226,757 | 7/1993 | Tarrant | 406/39 |

FOREIGN PATENT DOCUMENTS

| | | | |
|---|---|---|---|
| 384365 | 10/1939 | Canada | 406/39 |
| 2513290 | 10/1976 | Germany | 406/39 |

Primary Examiner—Michael S. Huppert
Assistant Examiner—Gregory A. Morse
Attorney, Agent, or Firm—Wheeler & Kromholz

[57] ABSTRACT

The invention is a multipurpose adaptor box for a dump truck designed to fit into the dump truck box of a dump truck. The adaptor box has an exterior surface that surrounds an interior chamber so that the box defines essentially a bottom and four sides with an open top. The rear side of the adaptor box (i.e. the tailgate) includes a door means for providing access to the interior chamber. The door is swing mounted on hinges to the exterior surface of the adaptor box and has an opening passing through it that is designed to allow a leaf blower system to be attached to the adaptor box so that lawn refuse can easily be loaded into the adaptor box when desired. A removable opening cover, capable of being mounted to the door, is provided for covering the opening when it is not needed. The open top of the adaptor box is defined by the top edges of the side walls. A grate is used to cover the top opening to the adaptor box. Additionally, on the upper sides of the adaptor box, extending form the front to the back of the box, a side door is located. This door is in addition to the door located on the back or tailgate of the box of the present invention. These doors provide both curb and street side access to the interior of the box for snow removal or other waste hauling activity.

6 Claims, 4 Drawing Sheets

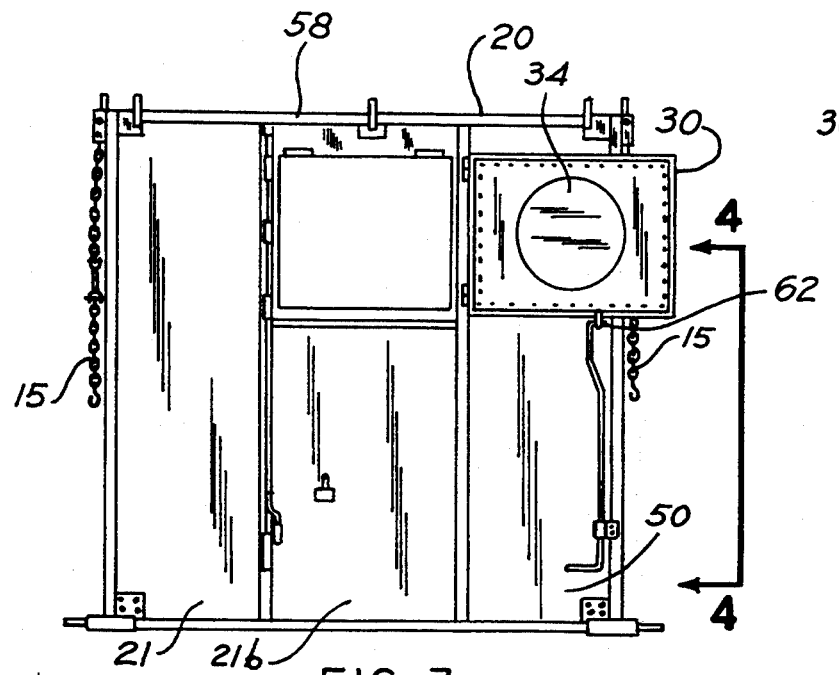
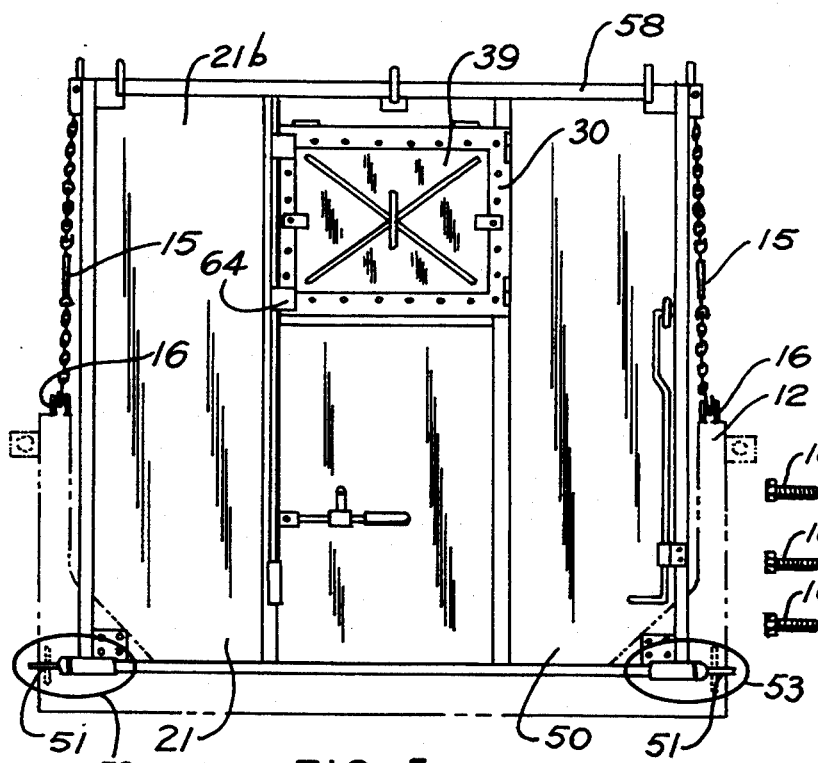

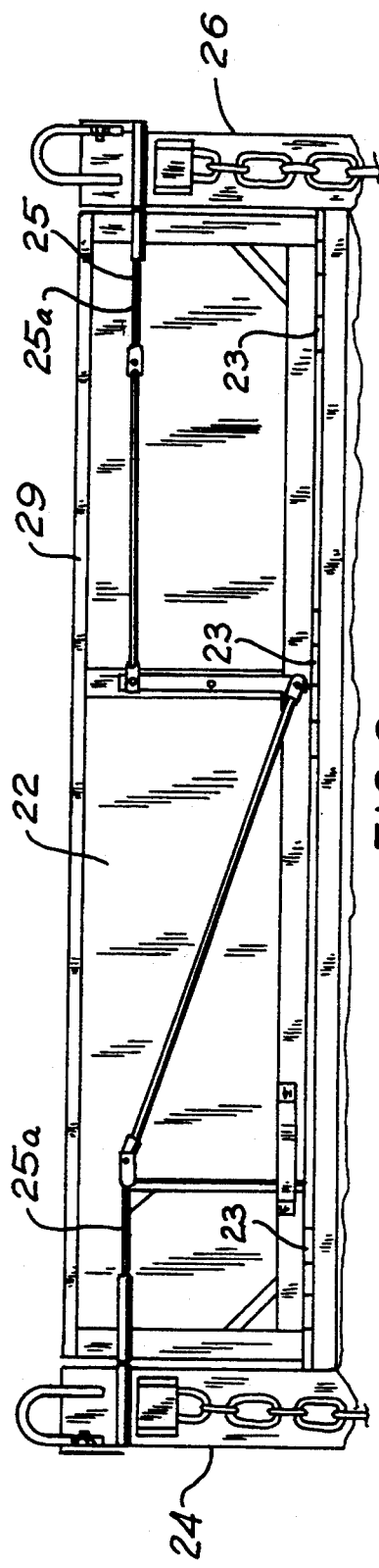
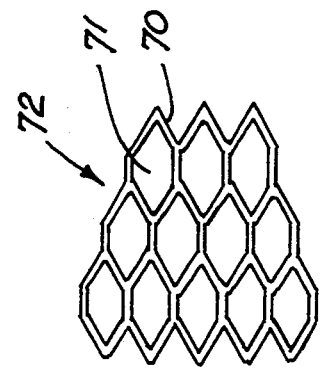
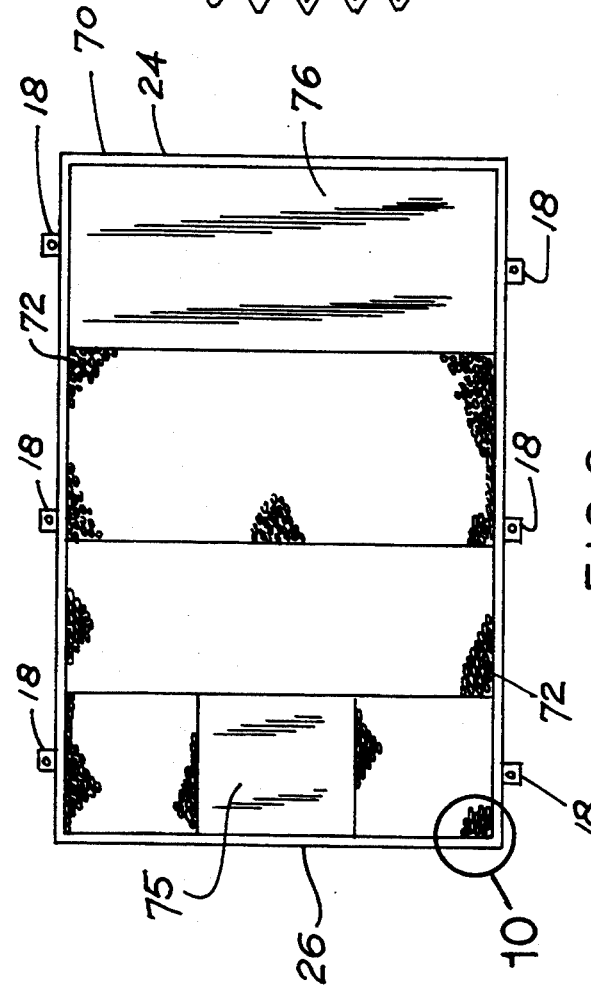

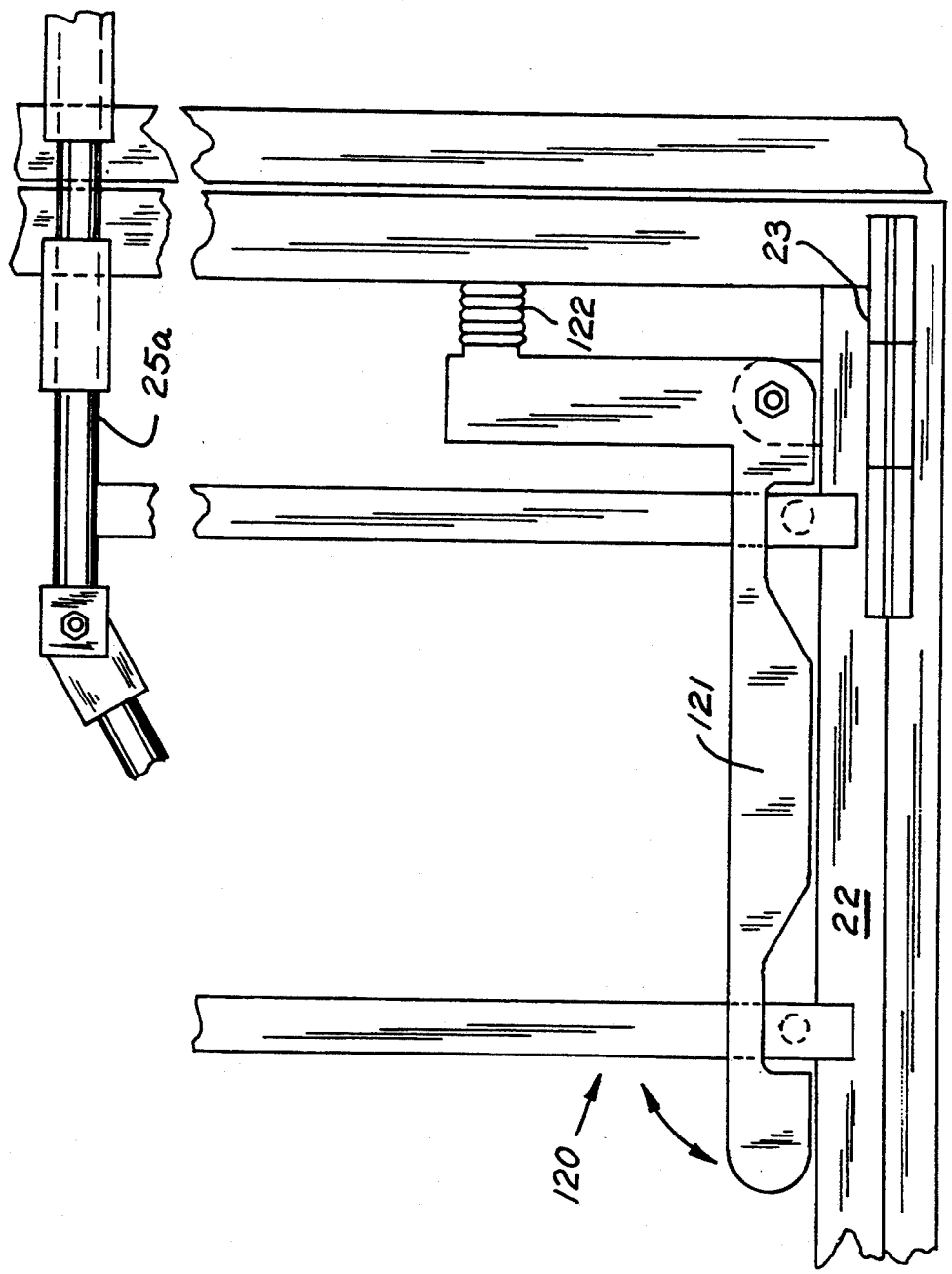

MULITPURPOSE DUMP TRUCK ADAPTOR

BACKGROUND OF THE INVENTION

The present invention relates generally to the field of dump trucks and specifically for dump trucks that are used to remove waste, plant refuse, or snow. Typically, depending upon the task, several different types of dump truck bodies have been required for various types of jobs. This is because each job, be it snow removal, waste removal, or the removal of plant refuse, requires a truck or truck body having particular types of features specifically tailored to the particular job required.

This specialization of truck body type requires a company or municipality to invest a large amount of capital in order to own or have available the various types of trucks or truck bodies required. The present invention by means of a unique and simple design eliminates the necessity of purchasing or leasing a large variety of different types of trucks specifically tailored to specific functions and instead allows one insert or truck body to be used for all jobs. This allows a company or municipality to save money by using fewer trucks or truck bodies while still being able to adequately respond to the needs of the customers or taxpayers for waste, snow, and plant matter removal.

The inventor knows of no prior art that either shows or teaches the unique structure of the present invention.

SUMMARY OF THE INVENTION

The invention is a multipurpose adaptor for a dump truck having a dump truck box. Essentially the multipurpose adaptor of the present invention is comprised of an adaptor box designed to fit into the dump truck box of a dump truck.

The adaptor box has an exterior surface that surrounds an interior chamber so that the box defines essentially a bottom and four sides with an open top. Each side has a top edge. The rear side of the adaptor box (i.e. the tailgate) includes a door means for providing access to the interior chamber. The door is swing mounted on hinges to the exterior surface of the adaptor box and has an opening passing through it that is designed to allow a leaf blower system to be attached to the adaptor box so that lawn refuse can easily be loaded into the adaptor box when desired. A removable opening cover, capable of being mounted to the door, is provided for covering the opening when it is not needed.

It should be noted that the rear side of the adaptor box is designed to work like a normal tailgate on a dump truck. Accordingly, it is hingedly connected to the top edge of the box and held shut by the locking mechanism of the truck. Since most dump trucks have the tail gate release inside the truck cab this particular feature of the present invention allows the tailgate to be released from the cab just as though it were an integral unit of the truck.

The open top of the adaptor box is defined by the top edges of the side walls. The open top is essentially a large opening into the interior chamber of the adaptor box. A grate is used to cover the top opening to the adaptor box and the grate is connected to the top edges of the side wall so that the entire area of the large opening is covered by the grate.

The grate provides a safety feature for the adaptor box in that it allows air into and out of the box but prevents a worker from falling into the box or large pieces of refuse from escaping. It is necessary that there be some type of opening in the box in addition to the opening of the door or through the door. This additional opening allows air to escape from the box so that undue pressure does not build up within the box. This is necessary because industrial leaf blower or vacuum systems move air with such force that it is literally possible to blow or bow out a side wall of the box if there is no way for the excess air to escape.

Additionally, on the upper sides of the adaptor box, extending from the front to the back of the box, a side door is located. This door is in addition to the door located on the back or tailgate of the box of the present invention. These doors provide both curb and street side access to the interior of the box for snow removal or other waste hauling activity.

These and other benefits of the present invention will be apparent to one skilled in the art from the following description.

DESCRIPTION OF THE DRAWINGS

FIG. 3 is an end view of the present invention showing the door open and the opening in the door.

FIG. 4 is a side view of FIG. 3 from line 4—4 of FIG. 3 and shows the latch mechanism for holding the door open and in place.

FIG. 5 is an end view of the adaptor box of the present invention with the door closed and a cover gasket over the door opening.

FIG. 6 is an elevational view for an alternate latch structure to the one shown in FIG. 5.

FIG. 7 is a cut away side view of the alternate latch structure shown in FIG. 6.

FIG. 8 is an elevational view showing the side door and side door locking mechanism of the present invention.

FIG. 9 is a top view of the grate that covers the top of the adaptor box.

FIG. 10 is close up view of the grate structure taken from reference line 10 of FIG. 9.

FIG. 11 is a plan view of a spring loaded arm for an alternate side door locking mechanism for the side door shown in FIG. 8.

DETAILED DESCRIPTION

Figure 1:
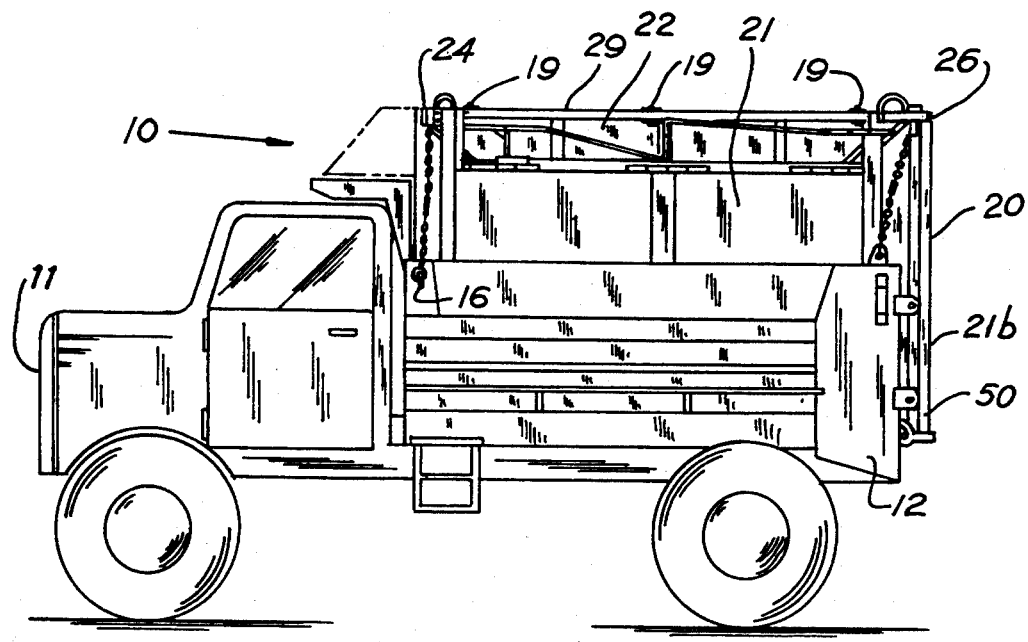
FIG. 1 is a side elevational view of a dump truck with the present invention mounted in it.

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Referring to FIGS. 1-5 it may be seen that the present invention 10 is an adaptor box 20 that is designed to fit into the box 12 of a dump truck 11. The adaptor box 20 is 76 inches (193 cm) tall as opposed to the standard 36 inch or 1 yard (91.4 cm) box 12 of a dump truck 11.

Figure 2:
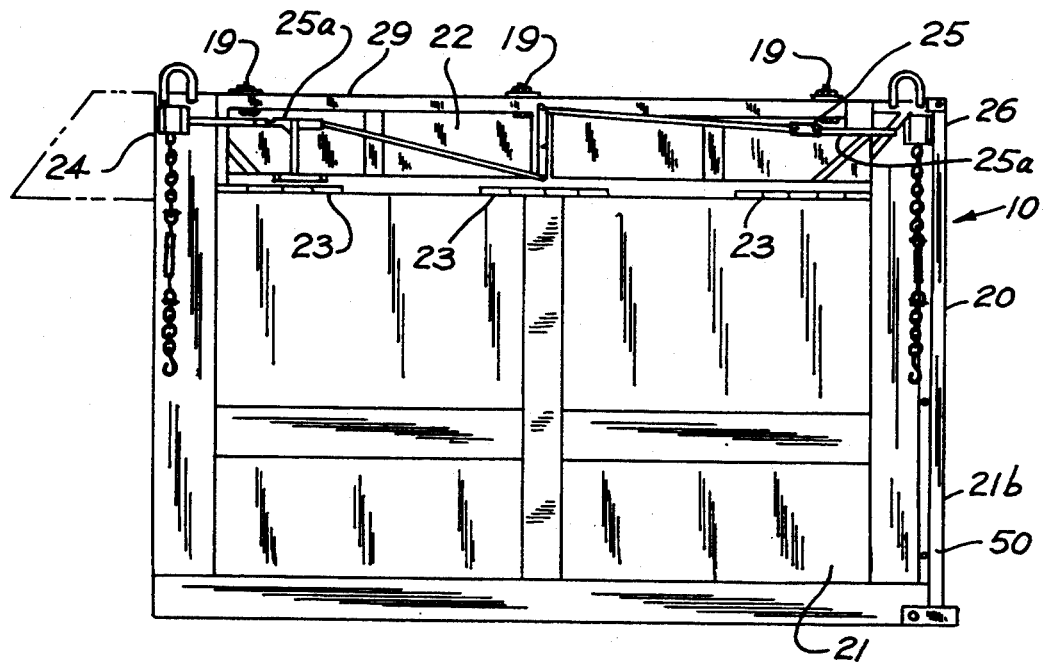
FIG. 2 is a side elevational view of the adaptor box of the present invention.

The adaptor box 20 has four sides 21 a front side 24, a rear side 26 (also referred to as 21b), and at least one side has an upper side door 22 that allows a snow thrower or loader to fill the bed of the box 20 with snow from either the street or the curb side of the truck 11. The upper side door 22 is typically hingedly connected by hinges 23 to the sides 21 that extend from the front 24 to the rear 26 of the box 20. The upper side door 22 is held in the closed position, as shown in FIGS. 1, 2, and 8, by a bar and rod locking mechanism 25.

Also, referring specifically to FIGS. 3, 4, and 5, the adaptor box 20 may be seen to have a rear side door 30 located on its rear side 21b which is also the tailgate 50. The rear side 21b is equipped with a latch 62 for holding the rear side door 30 open to prevent the door 30 from becoming unlatched due to vibration when the dump truck 11 is on the move. The tailgate 50 also includes a latch 64 to hold the door 30 closed. A circular opening 34 for attaching a leaf blower is shown in FIG. 3.

Further, referring to FIGS. 3 and 5, a new tailgate 50 is provided to replace the old tailgate of the dump truck 11. The new tailgate 50 requires no new locking bar as the old trip mechanism of the dump truck 11 works on the new tail gate 50. The tailgate 50 is hung in place by a hidden hanger 58.

The adaptor box 20 is held in place in the truck box 12 by chains and turnbuckles 15 that hook to the old pivot pins 16 of the truck box 12.

Referring to FIG. 9 a series of bolt openings 18 may be seen. These openings 18 line up with bolt openings 19 located along the top edge 29 of the box 20 and the top screen or grate 70 having openings 71 in place when bolted to the box 20. The openings 71 allow the release of air from the adaptor box 20. Additionally, plates 75 and 76 are located on the front and rear of the screen 70. The plates 75 and 76 are arranged so as to help confine any debris blown into the box 20.

Accordingly, the adaptor or collection box 20 is 76 inches (193 cm) tall by 76 inches (193 cm) wide inside, 80 inches (203 cm) wide outside. This will be the basic size of width. Length will vary from 9, 10, 12 feet (274 cm, 305 cm, 366 cm) in length. The collection box 20 has a 12 to 16 cubic yard (9.17 to 12.22 cubic meters) capacity depending on what size box is used. The two side doors 22 allow the user both street side and curb side capability of loading snow with a blower or loader. Both doors 22 are latched to prevent opening while the truck 11 is in use. The door 30 of the tailgate 50 has an opening 34 so that when the door 30 is closed and the cover 39 removed it accepts the leaf blower chute; when opened it allows room for tree chips to be blown into the box 20. This door 30 also has a positive latch 64 holding it closed when leaf collection is being done, and positive latch 62 to hold it open when chipping, for snow removal or transporting of mulch, compost, etc. A plate or plug 39 covers the opening 34 in the rear door 30. Chains, hooks and turnbuckles 15 hold the box 20 to the dump body 12.

All attaching parts have a working load of 7100 pounds, with the exception of the turn-buckle which have a 3500 pound working load. All of the above components have a five to one safety ratio i.e. 3500 pounds times 5 which equals 16500 breaking strength. The bolt that attaches the front two chains and turnbuckles have a working load of 3500 pounds with a five to one breaking ratio. The top is at this time secured by 6 bolts, grade 8 that pass through 6 plates to positively lock the vented roof 70 in place while chipping or leaf collection are being done. Venting of the roof 70 is done by use of expanded steel mesh 72 welded to the roof frame work.

Alternatively, referring to FIGS. 6 and 7 the bottom latching mechanism 51, shown at location 53, of the tailgate 50 may be modified to be adjustable. FIG. 6 shows a side elevational view of the adjustable mechanism 100. FIG. 7 shows a cut away side view of the adjustable mechanism 100. As may be seen this mechanism has threaded openings 102 for bolts 104 and slots 106. The slots 106 may be used to adjust the tailgate 50 up or down as desired and the bolts 104 may then been screwed into the openings 102 and the tailgate 50 held in place. This adjustability feature allows the invention 10 to be made more adaptable to various types of truck bodies.

Also, referring now to FIG. 11 and referring back to FIG. 8, an alternate locking mechanism 120 for the side door 22 shown in FIGS. 1, 2, and 8 is disclosed. This alternate locking mechanism 120 consists of a spring loaded arm 121 and a spring 122. The spring 122 keeps a downward pressure on the arm 121 to positively lock the side door 22 in place when it is in the closed position, as shown in FIGS. 1 and 2, and to keep the lock pins 25a from moving when the door 22 is in the down position.

The foregoing is considered as illustrative only of the principles of the invention. Furthermore, since numerous modifications and changes will readily occur to those skilled in the art, it is not desired to limit the invention to the exact construction and operation shown and described.

What is claimed is:

1. A multipurpose adaptor box for a dump truck box having a dump truck, the multipurpose adaptor box comprising:
   a front wall, a rear wall, a bottom wall, and two side walls;
   the front wall, rear wall, and side walls having top edges and forming an exterior surface defining an interior chamber;
   the bottom wall forming the bottom of the chamber;
   the chamber having an open top defined by the top edges;
   the rear wall being hingedly attached to the side walls and including a first door for providing access to the interior chamber;
   the first door being hingedly attached to the rear wall and having a leaf blowing opening;
   the first door further including a removable cover removably mounted to the first door for covering the leaf blower opening;
   a grate for covering the interior chamber being mounted to the top edges;
   at least one side wall including a second door for allowing access to the interior chamber;
   the second door being hingedly mounted on an upper portion of the side wall and extending the entire length of the side wall.

2. The multipurpose adaptor box of claim 1 wherein the first door further includes two latch mechanisms;
   the first for securing the door in a closed position;
   the second for securing the door in an open position.

3. The multipurpose adaptor box of claim 1 wherein the second door includes a latch mechanism for securing the door in an upright closed position.

4. The multipurpose adaptor box of claim 1 further including a plurality of chains having two ends;
   the first end of each chain being attached to a side wall;
   the second end of each chain being attached to the dump truck box.

5. The chains of claim 4 further including turnbuckles.

6. A multipurpose adaptor box for a dump truck sized to fit into a dump truck box of a dump truck, the multipurpose adaptor box consisting of:
- a front wall, a rear wall, a bottom wall, and two side walls;
- the front wall, rear wall, and side walls having top edges and forming an exterior surface defining an interior chamber;
- the bottom wall forming the bottom of the chamber;
- the chamber having an open top defined by the top edges;
- the rear wall being hingedly attached to the side walls and including a first door for providing access to the interior chamber;
- the first door being hingedly attached to the rear wall and having a leaf blowing opening;
- the first door further including a removable cover removably mounted to the first door for covering the leaf blower opening;
- a grate for covering the interior chamber being mounted to the top edges;
- at least one side wall including a second door for allowing access to the interior chamber;
- the second door being hingedly mounted on an upper portion of the side wall and extending the entire length of the side wall.

* * * * *